(12) United States Patent
Hardro et al.

(10) Patent No.: US 7,186,369 B1
(45) Date of Patent: Mar. 6, 2007

(54) METHOD OF FORMING A PART MADE OF A MOLYBDENUM-COPPER COMPOSITE MATERIAL

(75) Inventors: Peter J. Hardro, Seekonk, MA (US); Brent Stucker, Logan, UT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/076,459

(22) Filed: Mar. 4, 2005

Related U.S. Application Data

(62) Division of application No. 10/637,084, filed on Aug. 4, 2004, now abandoned.

(51) Int. Cl.
*B22F 3/26* (2006.01)
(52) U.S. Cl. .......................................... 419/27; 419/37
(58) Field of Classification Search .................. 419/27, 419/37
See application file for complete search history.

(56) References Cited

U.S. PATENT DOCUMENTS

| 5,574,959 | A | * | 11/1996 | Tsujioka et al. ................ 419/2 |
| 5,745,834 | A | * | 4/1998 | Bampton et al. ............. 419/37 |
| 6,271,585 | B1 | * | 8/2001 | Osada et al. ................. 257/712 |
| 6,554,882 | B1 | | 4/2003 | Zhou et al. |
| 2001/0003377 | A1 | * | 6/2001 | Yoo et al. .................... 257/712 |
| 2002/0015654 | A1 | * | 2/2002 | Das et al. ...................... 419/8 |
| 2004/0081573 | A1 | | 4/2004 | Newell |
| 2004/0226405 | A1 | * | 11/2004 | Geving et al. ................ 75/252 |

* cited by examiner

*Primary Examiner*—Ngoclan T. Mai
(74) *Attorney, Agent, or Firm*—James M. Kasischke; Michael P. Stanley; Jean-Paul A. Nasser

(57) ABSTRACT

The present invention relates to a method of forming a part made of a molybdenum-copper composite material. The composite material is formed by forming a mixture of molybdenum, phenolic, and wax, laser sintering the mixture to form a green form, placing the green form and oxygen free copper into a furnace, and subjecting the green form and oxygen free copper to a furnace heating cycle.

6 Claims, No Drawings

METHOD OF FORMING A PART MADE OF A MOLYBDENUM-COPPER COMPOSITE MATERIAL

The present application is a division of patent application Ser. No. 10/637,084, filed 4 Aug. 2004 now abandoned.

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATIONS

This patent application is co-pending with three related patent applications consisting of: Ser. No. 10/637,082, filed 4 Aug. 2003, entitled STAINLESS STEEL-COPPER COMPOSITE MATERIAL, Ser. No. 10/637,084, filed 4 Aug. 2003, entitled "MOLYBDENUM-COPPER COMPOSITE MATERIAL FOR SELECTIVE LASER SINTERING"; and Ser. No. 10/899,427, filed 26 Jul. 2004, entitled "A METHOD FOR FORMING A PART MADE OF A STAINLESS STEEL-COPPER COMPOSITE MATERIAL. All the foregoing applications are by the same coinventors as this application.

BACKGROUND OF THE INVENTION (1) Field of the Invention

The present invention relates to a molybdenum-copper composite material which may be used to manufacture parts and tools requiring working temperatures up to 1,000 degrees Centigrade and to a method of making the composite material to a desired form using either cold pressing or selective laser sintering.

(2) Description of the Prior Art

Sintered copper alloys are known in the art. For example, U.S. Pat. No. 4,935,056 to Miyasaka illustrates a wear-resistant copper-base sintered oil containing bearing material having a structure which contains 2 to 11% by weight of tin and 1 to 20% by weight of cobalt and further includes 2 to 15% by weight of at least one of molybdenum disulfide, graphite and lead serving as solid lubricants. Dispersed throughout the structure is cobalt at an average particle size equal to or less than 20 microns.

U.S. Pat. No. 5,824,922 to Aonuma illustrates a wear-resistant sintered alloy having a general composition consisting essentially of in weight ratio 0.736 to 9.65% nickel, 0.736 to 2.895% copper, 0.294 to 0.965% molybdenum, 0.12 to 6.25% chromium, and 0.508 to 2.0% carbon with the balance being iron, and inevitable impurities. The alloy has a metallic structure in which there are dispersed (1) a martensite, (2) a bainite having a nucleus of sorbite and/or upper bainite surrounding said nucleus, (3) an austenite having a high nickel concentration, and (4) a hard phase surrounding with a ferrite having a high chromium concentration and composed mainly of a chromium carbide.

U.S. Pat. No. 5,870,663 to Stucker et al. illustrates a wear-resistant Zirconium-DiBoride ($ZrB_2$)-Copper Alloy composite electrode. Wherein the first furnace cycle produces a sintered shaped form which is about 30 vol. % to about 70 vol. % occupied by sintered $ZrB_2$. Wherein the first furnace cycle comprises heating the desired form room temperature to about 1,300 decrees C to about 1,900 degrees C. Wherein the sintered $ZrB_2$ is then contacted with a copper alloy comprised of up to about 3 wt. % boron and up to about 10 wt. % nickel. Wherein a second furnace cycles is used to heat the sintered $ZrB_2$ and copper alloy above the melting point of the copper alloy to infiltrate the $ZrB_2$ with copper alloy to form a $ZrB_2$/copper alloy composite electrode.

Despite the existence of these materials, there exists a need for a material that offers the ability to create tools and prototype parts requiring working temperatures up to 1000 degrees Centigrade.

SUMMARY OF THE INVENTION

Accordingly, it is an object of the present invention to provide a composite material that offers the ability to create tools and prototype parts requiring working temperatures up to 1000 degrees Centigrade.

It is a further object of the present invention to provide a composite material as above which has a low coefficient of thermal expansion.

It is still a further object of the present invention to provide a method for manufacturing the above composite material.

The foregoing objects are attained by the composite material and method of the present invention.

In accordance with the present invention, a composite material is provided which has a molybdenum particulate and an oxygen free copper matrix. The molybdenum is preferably present in an amount of 35–65 vol % with the balance being of oxygen free copper.

Also, in accordance with the present invention, a method for manufacturing a molybdenum-copper composite material broadly comprises forming a mixture of molybdenum, phenolic, and wax, forming the mixture into a green form using either a selective laser sintering process or a cold pressing process, placing the green form and oxygen free copper into the furnace adjacent to the green form, and subjecting the green form and the oxygen free copper to a furnace cycle. During the furnace cycle the wax and phenolic thermoset resin is vaporized and the molybdenum is sintered. Additionally, the sintered molybdenum substrate, which is contacted with copper, is heated above the melting point of the copper which causes the copper to infiltrate the molybdenum substrate, forming the molybdenum-copper composite part.

Other details of the molybdenum-copper composite material, as well as other objects and advantages attendant thereto, are set forth in the following detailed description.

DESCRIPTION OF THE PREFERRED EMBODIMENT(S)

The molybdenum-copper composite material is a particulate composite created from molybdenum, phenolic, wax, and oxygen free copper. The material is manufactured using an indirect selective laser sintering (SLS) process, where a molybdenum/phenolic/wax powder mixture is initially sintered into a green form. Upon completion of sintering, the green form is placed through a furnace cycle for de-binding and infiltration of the oxygen free copper.

Molybdenum is a hard, malleable, ductile, high melting, silver white metal with a body-centered cubic crystalline structure. It is a metallic element which is most frequently used as an alloying addition in alloy and stainless steels. Its alloying versatility is unmatched because its addition enhances strength, hardenability, weldability, toughness, elevated temperature strength and corrosion resistance.

Alloys containing molybdenum are used in making high-speed cutting tools, aircraft parts, and forged automobile parts. Because it retains its strength and structure at very high temperatures, it has found use in certain critical rocket and missile parts. Molybdenum is not attacked by air at ordinary temperature, but at elevated temperatures, it oxidizes to form molybdenum oxide. Molybdenum melts at about 2617 degrees Centigrade.

The desired material properties of molybdenum is as follows:

| Property | Molybdenum |
| --- | --- |
| Density (g/cm$^3$) | 10.22 |
| Tensile Yield Strength (MPa) | 550 |
| Ultimate Tensile Strength (MPa) | 650 |
| Modulus of Elasticity (GPa) | 324.8 |
| Hardness (Vickers, Gpa) | 200 |
| Coefficient of Thermal Expansion (m/m/° C.) | 5.04E−6 |
| Thermal Conductivity (W/mK) | 146 |
| Melting point (° C.) | 2,614 |

Phenolic is a thermoset synthetic resin generally employed as a molding material for the making of mechanical and electrical parts. There are hundreds of different phenolic molding compounds and in general they have a balance of moderately good mechanical and electrical properties and are generally suitable in temperatures up to 160 degrees Centigrade. The resins are marketed usually in a granular form, partly polymerized for molding under heat and pressure which completes the polymerization process, making the product infusible and relatively insoluble.

The desired material properties of the phenolic thermoset resin is as follows:

| Property | Phenolic |
| --- | --- |
| Density (g/cm$^3$) | 1.1–1.3 |
| Tensile Yield Strength (MPa) | 52.0 |
| Ultimate Tensile Strength (MPa) | 60.0 |
| Ultimate Compressive Strength (MPa) | 140.0 |
| Modulus of Elasticity (GPa) | 6.0 |
| Hardness | 130.0, Rockwell M |
| Coefficient of Thermal Expansion (m/m/° C.) | 77.0E−6 |
| Thermal Conductivity (W/mK) | 0.2 |
| Electrical Resistivity (Ohm-cm) | 5.0E11 |
| Melting point (° C.) | — |
| Maximum Service Temperature (° C.) | 160 |

Oxygen-free high conductivity copper (C10100) is produced by the direct conversion of selected refined cathodes and castings under carefully controlled conditions to prevent any contamination of the pure oxygen-free metal during processing. The method of producing oxygen-free high conductivity copper insures extra high grade of metal with a copper content of 99.9% by weight. With so small a content of extraneous elements, the inherent properties of elemental copper are brought forth to a high degree. Characteristics are high ductility, high electrical and thermal conductivity, high impact strength, good creep resistance, ease of welding, and low volatility under high vacuum. Some typical uses for copper alloy C10100 in the electrical and electronic industries are bus bars, bus conductors, wave guides, hollow conductors, lead-in wires and anodes for vacuum tubes, glass to metal seals and others.

The desired material properties of the oxygen free copper is as follows:

| Property | O$_2$ Free Cu |
| --- | --- |
| Density (g/cm$^3$) | 8.96 |
| Tensile Yield Strength (MPa) | 33.3 |
| Ultimate Tensile Strength (MPa) | 210 |
| Modulus of Elasticity (GPa) | 110 |
| Hardness (Vickers, Gpa) | 49 |
| Coefficient of Thermal Expansion (m/m/° C.) | 17.64E−6 |
| Thermal Conductivity (W/mK) | 346 |
| Melting point (° C.) | 1,083 |

To form the composite material of the present invention, a mixture of molybdenum, phenolic, and wax is formed. The mixture may be shaped into the form of a part or component to be produced. The mixing of molybdenum particles with wax and phenolic thermoset resin particles should be done in a way such that the particles are evenly dispersed. The preferred molybdenum, wax, and phenolic thermoset resin particle size for the selective laser sintering shaping method should be between 10 microns and 145 microns, with an average particle size of between 20 microns and 45 microns. This is because the powder in the selective laser sintering machine is moved by a counter-rotating roller, and this method of powder transfer does not work well for finer powders.

In mixing the particles, the recommended molybdenum, wax, and phenolic thermoset resin mixture is 3% phenolic thermoset resin particles, 2.5% wax particles, balance molybdenum particles, by weight. The proper ratio of wax, phenolic thermoset resin particles, and molybdenum particles has an effect on shrinkage during selective laser sintering of the particle mixture to "tack" together the molybdenum particles and during sintering of the desired form which vaporizes the wax and phenolic thermoset resin and sinters the molybdenum particles.

Where mass production of simple shaped parts is desired, "cold pressing" the mixture of molybdenum particles, wax particles, and phenolic thermoset resin particles is the preferred method of shaping a desired form.

A version of "rapid prototyping" is preferred where the part to be manufactured is of complex or varying topography or where limited numbers of parts are to be manufactured. "Rapid prototyping" is a known technology to facilitate rapid product development. The version of rapid prototyping as disclosed herein is suitable for processing or shaping a mixture of molybdenum particles, wax particles, and phenolic thermoset resin particles into a desired form. This is particularly advantageous for complex or varying topographies.

In rapid prototyping, a 3-D model produced on a computer-aided design (CAD) system is mathematically divided into a large number of thin layers, a few thousandths of an inch thick. The different processes for rapid prototyping generally work on the same basis principle, i.e., the desired part is built up in small layers, about 0.003" thick to about 0.005" thick, one layer at a time, starting from the bottom and working up until the entire part is finished. Thus, the layers are built, and simultaneously consolidated to the preceding layer, using the description of that layer from the computer.

The preferred rapid prototyping technique is "selective laser sintering" ("SLS"). SLS uses a CO$_2$ laser to sinter a mixture of molybdenum particles, wax particles, and phenolic thermoset resin particles by scanning in the horizontal plane only as dictated by a current layer description in a CAD model. The three dimensional solid is built up by the addition of material layers.

The SLS machine consists of hardware and software components. The hardware components include the process chamber and powder engine, the controls cabinet, and the atmospheric control unit. The process chamber incorporates the laser, pre-heater, and the powder handling equipment. The controls cabinet interprets the CAD drawing and controls and monitors the SLS process. The atmospheric control unit regulates the temperature and amount of $N_2$ flowing through the air in the chamber. It also filters the air that flows through the process chamber. The software components utilize the UNIX operating system and other DTM Corporation proprietary applications.

The CAD drawing is geometrically modified to horizontally divide the desired form into thin horizontal layers. These layers can be adjusted in thickness, but are typically about 0.003" to about 0.005" in thickness. The thin layers represent sintering planes to be traced by the $CO_2$ laser. In operation, a layer of a mixture of molybdenum particles, wax particles, and phenolic thermoset resin particles is spread out. When the desired cross section of the layer is traced out by the $CO_2$ laser, the temperature of the mixture of molybdenum particles, wax particles, and phenolic thermoset resin particles is increased, and the wax and phenolic thermoset resin particles fuse the molybdenum particles together. The part is then lowered in the SLS machine by 0.003" to 0.005" (depending upon the layer thickness), and new layers are added in a similar fashion to form the solid mass. The SLS machine builds the part one layer at a time by creating the bottom layer first, and then adding layers until the part is finished.

The mixture of molybdenum particles, wax particles, and phenolic thermoset resin particles was laser sintered using the DTM SINTERSTATION 2500plus machine which sinters only the wax and phenolic thermoset resin particles and not the molybdenum particles. As described below, post processing is necessary to vaporize, sublime, or "burn off" the wax and phenolic thermoset resin and sinter the molybdenum particles. After this, the sintered molybdenum substrate, which is porous, is infiltrated with an oxygen free copper. This post-SLS processing generally results in a small shrinkage due to the vaporization of the wax and phenolic thermoset resin and sintering of the molybdenum particles. By holding the processing variable constant, this shrinkage may be compensated for in the CAD design of the part, i.e., the CAD design provides for a slightly larger molybdenum, wax, and phenolic shaped form, such that upon shrinkage, the molybdenum-copper composite part will be the desired size.

The $CO_2$ laser used in the SLS machine is generally only capable of producing enough heat to fuse low-melting thermoset synthetic resin such as phenolic; as such, it is these and similar low-melting point materials, such as wax, which are used to mix with the molybdenum particles when the SLS process is employed. Additionally, the wax and phenolic thermoset resin used must suitably vaporize or sublime in the vaporization step prior to sintering the molybdenum particles.

The desired parameters for SLS shaping of a mixture of molybdenum particles, wax particles, and phenolic thermoset resin particles to the desired form are as follows:
Layer thickness: 0.003 inches
Right and left feed heater temperature: 55 degrees C.
Part heater set point: 75 degrees C.
Laser power: 12 Watts
Scan spacing: 0.003 inches
Scan speed: 150 inches per second After sintering or cold pressing has been completed, the green form is placed on an aluminum oxide plate which is located in a graphite crucible. Oxygen free copper is placed on top of tabs, which are also formed from the molybdenum, phenolic, wax mixture, that are adjacent to the green form. The amount of oxygen free copper to be used is 0.72×green weight including the green form and the tabs. The oxygen free copper is placed on the tabs and the entire green form, tabs, and oxygen free copper infiltrant material is then covered with aluminum oxide in particulate form. The crucible is then placed in a furnace with a process gas of 5% hydrogen, balance argon, and a process pressure of 1 Torr. The green form material and the oxygen free copper are subjected to a furnace cycle. The furnace cycle comprises taking the green form material and the oxygen free copper from room temperature (approximately 68 degrees Fahrenheit) to 600 degrees Centigrade over a period of 3 hours, holding at 600 degrees Centigrade for 1 hour, heating from 600 degrees Centigrade to 1,150 degrees Centigrade over a period of 2.3 hours, holding at 1,150 degrees Centigrade for 0.5 hours, then reducing the temperature from 1,150 degrees Centigrade to room temperature over a time period of 3 hours. During this single furnace cycle, vaporization of the wax and phenolic binder, sintering of the molybdenum particulate, and infiltration of the sintered molybdenum particles with oxygen free copper are accomplished. The vaporization step may be referred to by those skilled in the art as "burn-out"; however, this terminology is somewhat misleading in that it is preferred that substantially no oxygen be present during the sintering step. Oxygen present in the sintering step may lead to reduced wetting in the copper infiltration step.

Vaporization and sintering produces a sintered molybdenum shaped form that is about 35 volume % to about 65 volume % occupied by sintered molybdenum, i.e., about 35% to about 65% dense. The density may advantageously be varied, within these limits, depending upon the desired application. The density or porosity may be altered by varying the size or size distribution of the molybdenum particles used, varying the size or size distribution of either the wax or phenolic thermoset resin particles used, varying the particle mixture ratio used, and/or varying the manufacturing technique, etc. The density or porosity determines the molybdenum-copper ratio and may be optimized to meet specific objectives.

During the furnace operation the oxygen free copper is heated above its melting point (1,083 degrees C.), such that by capillary action, the copper infiltrates into the open area of the sintered molybdenum particles to produce the molybdenum-copper composite in the desired form with an about 100% density. The resulting mixture is a molybdenum-copper composite with a volume fraction of molybdenum of between 35% and 65% with the balance oxygen free copper.

Generally, the resulting average particle size diameter of the composite material is 2.31 microns, the mean free path is 1.99 microns, and the mean center to center particle spacing is 4.61 microns.

The composite material of the present invention is unique in that it offers the ability to create tools and prototype parts requiring working temperatures up to 1000 degrees Centigrade. The material is also advantageous because it has a low coefficient of thermal expansion. The present invention is also unique in that it offers properties above and beyond that of the commercially available selective laser sintering material systems. For example, it has a higher thermal conductivity than known stainless steel-copper alloy composite materials. Since an oxygen free copper (99.9% pure copper) is used in the preset invention it will have better thermal conductivity than known 90% copper-10% tin bronze infiltrant materials. A wide variety of parts may be made from the composite material of the present invention and the method of the present invention.

It is apparent that there has been provided in accordance with the present invention a molybdenum-copper composite material which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of forming a part made of a molybdenum-copper composite material comprising the steps of:
    forming a mixture of molybdenum, phenolic, and wax;
    forming said mixture into a green form using a selective laser sintering technique;
    placing the green form and an oxygen free copper into a furnace; and
    subjecting said green form and said oxygen free copper to a furnace cycle to form said composite material, said step of subjecting comprising:
    heating the green form and the oxygen free copper from room temperature to a first temperature 600 degrees Celsius over a time period of 3 hours;
    holding the green form and the oxygen free copper at the first temperature for 1 hour;
    heating the green form and the oxygen free copper to a second temperature of 1150 degrees Celsius over a time period of 2.3 hours, holding the green form and the oxygen free copper at the second temperature for 0.5 hours; and
    reducing the temperature in the furnace from said second temperature to room temperature in 3 hours.

2. A method according to claim 1, wherein said forming the mixture into a green form comprises mixing molybdenum, phenolic, and wax, all in particulate form having a particle size of between 10 and 145 microns, with an average particle size of 20 to 45 microns.

3. A method of forming a part made of a molybdenum-copper composite material comprising the steps of:
    forming a mixture of molybdenum, phenolic, and wax;
    forming said mixture into a green form using at least one of a selective laser sintering technique and a cold pressing technique wherein forming the mixture into a green form comprises forming a mixture having 3.0 wt % phenolic, 2.5 wt % wax, and the balance molybdenum;
    placing the green form and an oxygen free copper into a furnace; and
    subjecting said green form and said oxygen free copper to a furnace cycle to form said composite material.

4. A method of forming a part made of a molybdenum-copper composite material comprising the steps of:
    forming a mixture of molybdenum, phenolic, and wax;
    forming said mixture into a green form using at least one of a selective laser sintering technique and a cold pressing technique;
    placing said mixture in green form on an aluminum oxide plate located in a graphite crucible and placing said oxygen free copper material on top of at least one tab adjacent to said green form;
    placing the green form, aluminum oxide plate, graphite crucible and oxygen free copper into a furnace; and
    subjecting said green form and said oxygen free copper to a furnace cycle to form said composite material.

5. A method according to claim 4, wherein said placing of the oxygen free copper on said at least one tab comprises placing an amount of oxygen free copper on said at least one tab equal to 0.72×green weight.

6. A method according to claim 5, further comprising placing aluminum oxide in particulate form over said green form and said oxygen free copper.

* * * * *